US012561252B2

(12) United States Patent
Mulder et al.

(10) Patent No.: US 12,561,252 B2
(45) Date of Patent: Feb. 24, 2026

(54) DYNAMIC CACHE LOADING AND VERIFICATION

(71) Applicant: International Business Machines Corporation, Armonk, NY (US)

(72) Inventors: Yvo Thomas Bernard Mulder, Reutlingen (DE); Huiyuan Xing, Schwieberdingen (DE); Gerrit Koch, Ammerbuch (DE); Ulrike Letz, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/468,918

(22) Filed: Sep. 18, 2023

(65) Prior Publication Data

US 2025/0028644 A1 Jan. 23, 2025

(30) Foreign Application Priority Data

Jul. 20, 2023 (GB) ..................................... 2311093

(51) Int. Cl.
*G06F 12/0877* (2016.01)
*G06F 12/0837* (2016.01)
*G06F 12/0895* (2016.01)
(52) U.S. Cl.
CPC ...... *G06F 12/0877* (2013.01); *G06F 12/0837* (2013.01); *G06F 12/0895* (2013.01)
(58) Field of Classification Search
CPC ............. G06F 12/0837; G06F 12/0877; G06F 12/0895

(Continued)

(56) References Cited

U.S. PATENT DOCUMENTS 4,667,288 A * 5/1987 Keeley .................. G06F 11/073
711/E12.075
4,686,621 A * 8/1987 Keeley ................ G06F 12/0864
711/E12.018

(Continued)

FOREIGN PATENT DOCUMENTS

CN 109032879 A 12/2018
CN 114153680 A 3/2022

(Continued)

OTHER PUBLICATIONS

Chatterjee, P., Sivaraj, H., Gopalakrishnan, G. (2002). Shared Memory Consistency Protocol Verification Against Weak Memory Models: Refinement via Model-Checking. In: Brinksma, E., Larsen, K.G. (eds) Computer Aided Verification. CAV 2002. Lecture Notes in Computer Science, vol. 2404. Springer. (Year: 2002).*

(Continued)

*Primary Examiner* — Reginald G Bragdon
*Assistant Examiner* — Aaron D Ho
(74) *Attorney, Agent, or Firm* — Robert D. Bean

(57) ABSTRACT

The present disclosure relates to a computer implemented method for verification of a cache memory of a device under test. The method comprises executing a cache verification process configured for accessing via an interface and verifying the cache memory of the device under test. Cache accesses to the cache memory of the device under test by the cache verification process via the interface are monitored. A cache access by the cache verification process via the interface is detected. In response to the detecting of the cache access a target of the detected cache access is determined and the cache memory is modified for providing a pre-defined cache read-out result for the detected cache access. Via the interface the pre-defined cache read-out (Continued)

Executing a verification process for verifying a cache memory ~100

Monitoring cache accesses to the cache memory by the cache verification process ~102

Detecting a cache access by the cache verification process ~104

Determining a target of the detected cache access ~106

Modifying the cache memory for providing a pre-defined cache read out result ~108

Returning the pre-defined cache read out result to the cache verification process ~110

Checking the returned cache read out result by the cache verification process ~112

Depending on a result of the checking, generating verification pass signal or verification failure signal ~114 result is returned to the cache verification process in response to the detected cache access.

25 Claims, 4 Drawing Sheets

(58) Field of Classification Search
USPC ......................................................... 711/118
See application file for complete search history.

(56) References Cited

U.S. PATENT DOCUMENTS

| | | | | |
|---|---|---|---|---|
| 5,615,335 A * | 3/1997 | Onffroy | ................. | G11C 29/12 |
| | | | | 714/25 |
| 5,638,382 A * | 6/1997 | Krick | ...................... | G06F 11/27 |
| | | | | 714/E11.169 |
| 5,740,353 A | 4/1998 | Kreulen | | |
| 5,893,920 A * | 4/1999 | Shaheen | ............. | G06F 12/0813 |
| | | | | 711/E12.07 |
| 6,446,241 B1 * | 9/2002 | Mobley | ................... | G11C 29/08 |
| | | | | 716/106 |
| 6,480,800 B1 * | 11/2002 | Molyneaux | .... | G01R 31/318364 |
| | | | | 702/120 |
| 7,386,434 B1 * | 6/2008 | Cischke | ......... | G01R 31/318357 |
| | | | | 703/14 |
| 8,046,652 B2 * | 10/2011 | Taylor | .................... | G11B 20/18 |
| | | | | 714/733 |
| 8,595,680 B1 | 11/2013 | Steinberg | | |
| 2001/0001157 A1 * | 5/2001 | Oura | ................... | G06F 12/0802 |
| | | | | 714/42 |
| 2003/0033510 A1 * | 2/2003 | Dice | ..................... | G06F 9/3842 |
| | | | | 712/E9.05 |
| 2003/0051197 A1 * | 3/2003 | Evans | .................... | G11C 29/12 |
| | | | | 714/718 |
| 2004/0066695 A1 * | 4/2004 | Anand | ................. | G11C 29/027 |
| | | | | 365/201 |
| 2008/0071994 A1 * | 3/2008 | Fields | ................. | G06F 12/0811 |
| | | | | 711/E12.024 |
| 2010/0057996 A1 * | 3/2010 | Furukawa | ........... | G06F 12/0802 |
| | | | | 711/144 |
| 2011/0320716 A1 * | 12/2011 | Collura | ............... | G06F 11/0751 |
| | | | | 711/E12.017 |
| 2012/0151144 A1 * | 6/2012 | Yohn | ................... | G06F 12/0871 |
| | | | | 711/E12.024 |
| 2018/0129578 A1 | 5/2018 | Grosser | | |
| 2018/0260506 A1 * | 9/2018 | Wood | ..................... | G11C 29/54 |
| 2020/0174903 A1 | 6/2020 | Barreh | | |

FOREIGN PATENT DOCUMENTS

| | | |
|---|---|---|
| CN | 114741250 A | 7/2022 |
| CN | 115130402 B | 11/2022 |
| GB | 2631975 A | 1/2025 |

OTHER PUBLICATIONS

A. Meixner and D. J. Sorin, "Dynamic Verification of Memory Consistency in Cache-Coherent Multithreaded Computer Architectures," in IEEE Transactions on Dependable and Secure Computing, vol. 6, No. 1, pp. 18-31, Jan.-Mar. 2009, doi: 10.1109/TDSC.2007. 70243. (Year: 2009).*

S. Di Carlo, P. Prinetto and A. Savino, "Software-Based Self-Test of Set-Associative Cache Memories," in IEEE Transactions on Computers, vol. 60, No. 7, pp. 1030-1044, Jul. 2011, doi: 10.1109/TC. 2010.166. (Year: 2011).*

"Patents Act 1977: Search Report under Section 17 (5)", UK Search Report, Your Reference: P202203722GB01, Application No. GB2311093.5, Sep. 15, 2023, 3 pages.

Mulder et al., "Dynamic Cache Loading and Verification", United Kingdom Application No. 2311093.5, Filed Jul. 20, 2023, 37 pages.

Wulf et al., "SCIPS: An Emulation Methodology for Fault Injection in Processor Caches", IEEE Aerospace Conference Proceedings 2011, Mar. 5, 2011, 9 pages.

* cited by examiner

DYNAMIC CACHE LOADING AND VERIFICATION

BACKGROUND

The present invention relates to the field of digital computer systems, and more specifically, to a method for verification of a cache memory of a device under test.

Regarding cache memories, cache sizes have increased continuously from generation to generation. At the same time, the number of different cache directory states is increasing as well, thereby increasing the complexity of handling cache memories. When designing a cache, e.g., from scratch, the hardware may initially be able to handle only certain use cases, e.g., cache hits. Such restrictions may cause significant delays when developing new systems. For example, a core simulation may request random addresses, which may potentially miss the cache resulting in a test case the system may not yet be able to handle. As a consequence, given systems may only be able to handle reduced test case complexities with perfectly pre-loaded caches.

Thus, there is a need for an improved and more flexible approach for cache verification.

SUMMARY

Various embodiments provide a method for verification of a cache memory of a device under test, a computer program product for verification of a cache memory of a device under test, and a computer device for verification of a cache memory of a device under test as described by the subject matter of the independent claims. Advantageous embodiments are described in the dependent claims. Embodiments of the present invention can be freely combined with each other if they are not mutually exclusive.

In one aspect, the invention relates to a computer implemented method for verification of a cache memory of a device under test. The method comprises executing a cache verification process configured for accessing via an interface and verifying the cache memory of the device under test. Cache accesses to the cache memory of the device under test by the cache verification process via the interface are monitored. A cache access by the cache verification process via the interface is detected. In response to the detecting of the cache access a target of the detected cache access is determined. The cache memory is modified for providing a pre-defined cache read-out result for the detected cache access. The pre-defined cache read-out result is returned via the interface to the cache verification process in response to the detected cache access.

This may allow for a cache verification, i.e., a verification of a cache memory of a device under test, which may be able to avoid current system restrictions by enforcing pre-defined cache read-out results. The pre-defined read-out result may, e.g., be a read-out results of which it is known that a system in development, i.e., the device under test, is able to handle. Thereby, an early start of complex cache verification may be enabled, since it is not necessary to wait, until the system is able to handle all possible cases, which may occur under testing. By dynamically modifying the cache memory in a reactive manner on-the-fly in order to provide pre-defined cache read-out results, it is rather possible to ensure that only such cache read-out results are returned, which the system is able to handle or for which it is to be tested specifically whether the system is able to handle them.

Furthermore, the pre-defined read-out result may resemble an interesting scenario and/or corner case, which otherwise may be hard to hit in a random simulation. Using the aforementioned method such interesting scenarios and/or corner cases may be encountered deliberately. This may enable to close coverage of all relevant, interesting and/or possible scenarios in a purposeful manner. Time consuming approaches which require a pre-loading of all addresses of the cache memory letting driver pick a certain address and hoping to hit a scenario of interest may thus be avoided. By dynamically modifying the cache memory in a reactive manner on-the-fly in order to provide pre-defined cache read-out results resembling scenarios of interest, such scenarios of interest may be hit deliberately requiring comparably small compute resources. Furthermore, the time required for covering relevant scenarios of interest for a cache verification may be reduced significantly.

According to examples, it is not necessary to reduce test case complexity to enable a perfectly pre-loading cache memory. Examples may rather also enable a handling of not perfectly pre-loaded caches. It is not necessary to reduce test case complexity to only drive pre-loaded addresses. In case, e.g., a non-existing address is accessed by a cache access, the address being accessed may rather be added to the cache by modifying the cache memory accordingly in a dynamic manner responsive to the detected cache access. To achieve coverage, it is not necessary to restrict driving to trying to hit interesting cache states, but interesting cache states may rather be introduced deliberately by modifying the cache memory accordingly. No special test case restrictions may be required. Rather an on-demanded cache content update for the cache memory of the device under test based on test case requirements may be introduced.

For example, the modifying of the cache memory comprises modifying a data content of the cache memory, which is determined to be the target of the detected cache access. Modifying the data content of the cache memory may enable returning a pre-defined data content or a pre-defined type of data content in response to the detected cache access. For example, a given data content of the determined target of the detected cache access may deviate from a data content or type of data content required for the cache verification process. By modifying the given data content, e.g., by replacing the given data content with a pre-defined data content or a pre-defined type of data content as required for the cache verification process, it may dynamically be ensured that the required data content or type of data content is provided for the cache verification process by the cache access.

For example, the modifying of the cache memory comprises generating a data content of the cache memory, which is determined to be the target of the detected cache access. For example, the detected cache access may try to access a non-existing data content of the cache memory, e.g., a non-existing address. By generating the data content of the cache memory, which the detected cache access tries to access, and adding it to the cache memory, a returning of the generated data content as the data content requested by the cache access may be enabled dynamically. Thus, it may dynamically be ensured that a specific data content targeted by the cache verification process is provided for the cache verification process by the cache access, even in case the respective data content is initially not comprised by the cache memory.

For example, the modifying of the cache memory comprises modifying a state assigned to the target of the detected cache access. For example, a state may be assigned to the target of the detected cache access, which does not correspond to a state required for the cache verification process.

By modifying the state of the target, it may dynamically be ensured that the target of the detected cache access has the state required for the cache verification process and that the cache read-out result in response to the detected cache access is based on the required state, e.g., is descriptive of the required state.

For example, the modifying of the cache memory comprises modifying a directory state of the target of the detected cache access. For example, the result of the modified directory state resulting from the modifying of the directory state of the target of the detected cache access may be, but is not limited to, one of the following: valid, dirty, speculation, coherency.

For example, the modifying of the cache memory comprises modifying one or more of the following: a least recently used state of the target of the detected cache access, a most recently used state of the target of the detected cache access. According to a least recently used (LRU) state policy, those data elements may be discarded from the cache memory first which have the least recently been used. In order to keep track of what was used when, age-bits may be used for assigning LRU states. By modifying an LRU state assigned to the target of the detected cache access, it may dynamically be ensured that the target of the detected cache access has an LRU state required for the cache verification process. For example, the cache read-out result provided in response to the detected cache access may thus be based on the required LRU state. According to a most recently used (MRU) state policy, those data elements may be discarded from the cache memory first which have most recently been used. By modifying an MRU state assigned to the target of the detected cache access, it may dynamically be ensured that the target of the detected cache access has an MRU state required for the cache verification process. For example, the cache read-out result provided in response to the detected cache access may thus be based on the required MRU state.

For example, the modifying of the cache memory further comprises modifying a memory reference model of the cache memory of the device under test. The memory reference model may, e.g., define addresses of data content of the cache memory. Modifying data content of the cache memory may comprise modifying addresses of the data content. When modifying, e.g., addresses of data content of the cache memory, memory reference models referring to these addresses being modified may be modified accordingly.

For example, the modifying of the memory reference model comprises extending the pre-defined memory reference model. For example, when adding data content to the cache memory, an address space of addresses defined by the memory reference model may be extended by one or more additional addresses. When extending the memory reference model, these additional addresses may be taken into account by the memory reference model.

For example, the memory reference model is one of the following: a pre-defined local memory reference model, a pre-defined global reference model.

For example, the cache memory of the device under test is provided using a software simulation module configured for simulating the cache memory of the device under test. The software simulation module may simulate the device under test and/or the cache memory. Using a software simulation module, a cache memory design may, e.g., be tested and verified using the cache verification method and, if necessary, revised until the design successfully passes the verification. The successfully verified cache design may, e.g., be used as a template for producing cache memories and/or devices comprising cache memories with the verified cache memory design, like, e.g., chips, processors, multi-processor assemblies like multi-core processors, etc.

For example, the cache memory of the device under test is provided using a hardware device under test comprising the cache memory. The cache memory may, e.g., be provided as a hardware and/or software component of the hardware device under test. The hardware device under test may, e.g., be the cache memory. The hardware device under test may, e.g., be a hardware device comprising a cache memory, like, e.g., a chip, a processor, a multi-processor assembly like a multi-core processor, etc. Using the hardware device under test, e.g., as a prototype, a cache memory design may, e.g., be tested and verified under realistic conditions using the cache verification method. If necessary, a revised hardware device, e.g., with a revised cache memory design, may be provided for testing and verification, until the cache memory of the hardware device under test successfully passes the verification. For example, the hardware device under test may be a hardware device under test out of a production line and verified using the cache verification method for controlling quality of cache memories of hardware devices produced by the production line.

For example, the method further comprises checking the returned cache read-out result by the cache verification process and, depending on a result of the checking, generating one of the following: a verification pass signal, a verification failure signal. The verification pass signal is indicative of the cache memory of the device under test having passed the cache verification. The verification fail signal is indicative of the cache memory of the device under test having failed to pass the cache verification. A result of the verification process may be achieved based on the dynamic modification of the cache memory. Thus, a reliable result may even be achieved for test cases, for which the cache memory is initially not suited. By dynamic modifying the cache memory, while the verification process is executed and accesses the cache memory, the cache memory may on-the-fly be adjusted to such test cases.

In another aspect the invention relates to a computer program product for verification of a cache memory of a device under test. The computer program product comprises a computer-readable storage medium having computer-readable program code embodied therewith. The computer-readable program code is configured to implement a method comprising an execution of a cache verification process configured for accessing via an interface and verifying the cache memory of the device under test. Cache accesses to the cache memory of the device under test by the cache verification process via the interface are monitored. A cache access by the cache verification process via the interface is detected. In response to the detecting of the cache access a target of the detected cache access is determined. The cache memory is modified for providing a pre-defined cache read-out result for the detected cache access. The pre-defined cache read-out result is returned via the interface to the cache verification process in response to the detected cache access.

For example, the modifying of the cache memory comprises modifying a data content of the cache memory, which is determined to be the target of the detected cache access. Modifying the data content of the cache memory may enable returning a pre-defined data content or a pre-defined type of data content in response to the detected cache access. For example, a given data content of the determined target of the detected cache access may deviate from a data content or type of data content required for the cache verification process. By modifying the given data content, e.g., by replacing the given data content with a pre-defined data content or a pre-defined type of data content as required for the cache verification process, it may dynamically be ensured that the required data content or type of data content is provided for the cache verification process by the cache access.

For example, the modifying of the cache memory comprising generating a data content of the cache memory, which is determined to be the target of the detected cache access. For example, the detected cache access may try to access a non-existing data content of the cache memory, e.g., a non-existing address. By generating the data content of the cache memory, which the detected cache access tries to access, and adding it to the cache memory, a returning of the generated data content as the data content requested by the cache access may be enable dynamically. Thus, it may dynamically be ensured that a specific data content targeted by the cache verification process is provided for the cache verification process by the cache access, even in case the respective data content is initially not comprised by the cache memory.

For example, the modifying of the cache memory comprising modifying a state assigned to the target of the detected cache access. For example, a state may be assigned to the target of the detected cache access, which does not correspond to a state required for the cache verification process. By modifying the state of the target, it may dynamically be ensured that the target of the detected cache access has the state required for the cache verification process and that the cache read-out result provided in response to the detected cache access is based on the required state, e.g., is descriptive of the required state.

For example, the modifying of the cache memory comprising modifying a directory state of the target of the detected cache access. For example, the result of the modified directory state resulting from the modifying of the directory state of the target of the detected cache access may be, but is not limited to, one of the following: valid, dirty, speculation, coherency.

For example, the modifying of the cache memory comprises modifying one or more of the following: a least recently used state of the target of the detected cache access, a most recently used state of the target of the detected cache access. By modifying an LRU state assigned to the target of the detected cache access, it may dynamically be ensured that the target of the detected cache access has an LRU state required for the cache verification process. For example, the cache read-out result provided in response to the detected cache access may thus be based on the required LRU state. By modifying an MRU state assigned to the target of the detected cache access, it may dynamically be ensured that the target of the detected cache access has an MRU state required for the cache verification process. For example, the cache read-out result provided in response to the detected cache access may thus be based on the required MRU state.

For example, the modifying of the cache memory further comprising modifying a memory reference model of the cache memory of the device under test. The memory reference model may, e.g., define addresses of data content of the cache memory. Modifying data content of the cache memory may comprise modifying addresses of the data content. When modifying, e.g., addresses of data content of the cache memory, memory reference models referring to these addresses being modified may be modified accordingly.

In another aspect the invention relates to a computer for verification of a cache memory of a device under test, the computer being configured to implement a method comprising an execution of a cache verification process configured for accessing via an interface and verifying the cache memory of the device under test. Cache accesses to the cache memory of the device under test by the cache verification process via the interface are monitored. A cache access by the cache verification process via the interface is detected. In response to the detecting of the cache access a target of the detected cache access is determined. The cache memory for providing is modified a pre-defined cache read-out result for the detected cache access. The pre-defined cache read-out result is returned via the interface to the cache verification process in response to the detected cache access.

For example, the modifying of the cache memory comprises modifying a data content of the cache memory, which is determined to be the target of the detected cache access. Modifying the data content of the cache memory may enable returning a pre-defined data content or a pre-defined type of data content in response to the detected cache access. For example, a given data content of the determined target of the detected cache access may deviate from a data content or type of data content required for the cache verification process. By modifying the given data content, e.g., by replacing the given data content with a pre-defined data content or a pre-defined type of data content as required for the cache verification process, it may dynamically be ensured that the required data content or type of data content is provided for the cache verification process by the cache access.

For example, the modifying of the cache memory comprises generating a data content of the cache memory, which is determined to be the target of the detected cache access. For example, the detected cache access may try to access a non-existing data content of the cache memory, e.g., a non-existing address. By generating the data content of the cache memory, which the detected cache access tries to access, and adding it to the cache memory, a returning of the generated data content as the data content requested by the cache access may be enable dynamically. Thus, it may dynamically be ensured that a specific data content targeted by the cache verification process is provided for the cache verification process by the cache access, even in case the respective data content is initially not comprised by the cache memory.

For example, the modifying of the cache memory comprises modifying a state assigned to the target of the detected cache access. For example, a state may be assigned to the target of the detected cache access, which does not correspond to a state required for the cache verification process. By modifying the state of the target, it may dynamically be ensured that the target of the detected cache access has the state required for the cache verification process and that the cache read-out result provided in response to the detected cache access is based on the required state, e.g., is descriptive of the required state.

For example, the modifying of the cache memory comprises modifying a directory state of the target of the detected cache access. For example, the result of the modified directory state resulting from the modifying of the directory state of the target of the detected cache access may be, but not limited to, one of the following: valid, dirty, speculation, coherency.

For example, the modifying of the cache memory comprises modifying one or more of the following: a least recently used state of the target of the detected cache access, a most recently used state of the target of the detected cache access. By modifying an LRU state assigned to the target of the detected cache access, it may dynamically be ensured that the target of the detected cache access has an LRU state required for the cache verification process. For example, the cache read-out result provided in response to the detected cache access may thus be based on the required LRU state. By modifying an MRU state assigned to the target of the detected cache access, it may dynamically be ensured that the target of the detected cache access has an MRU state required for the cache verification process. For example, the cache read-out result provided in response to the detected cache access may thus be based on the required MRU state.

For example, the modifying of the cache memory further comprises modifying a memory reference model of the cache memory of the device under test. The memory reference model may, e.g., define addresses of data content of the cache memory. Modifying data content of the cache memory may comprise modifying addresses of the data content. When modifying, e.g., addresses of data content of the cache memory, memory reference models referring to these addresses being modified may be modified accordingly.

BRIEF DESCRIPTION OF THE DRAWINGS

The following detailed description, given by way of example and not intended to limit the invention solely thereto, will best be appreciated in conjunction with the accompanying drawings, in which.

DETAILED DESCRIPTION

Figure 1:
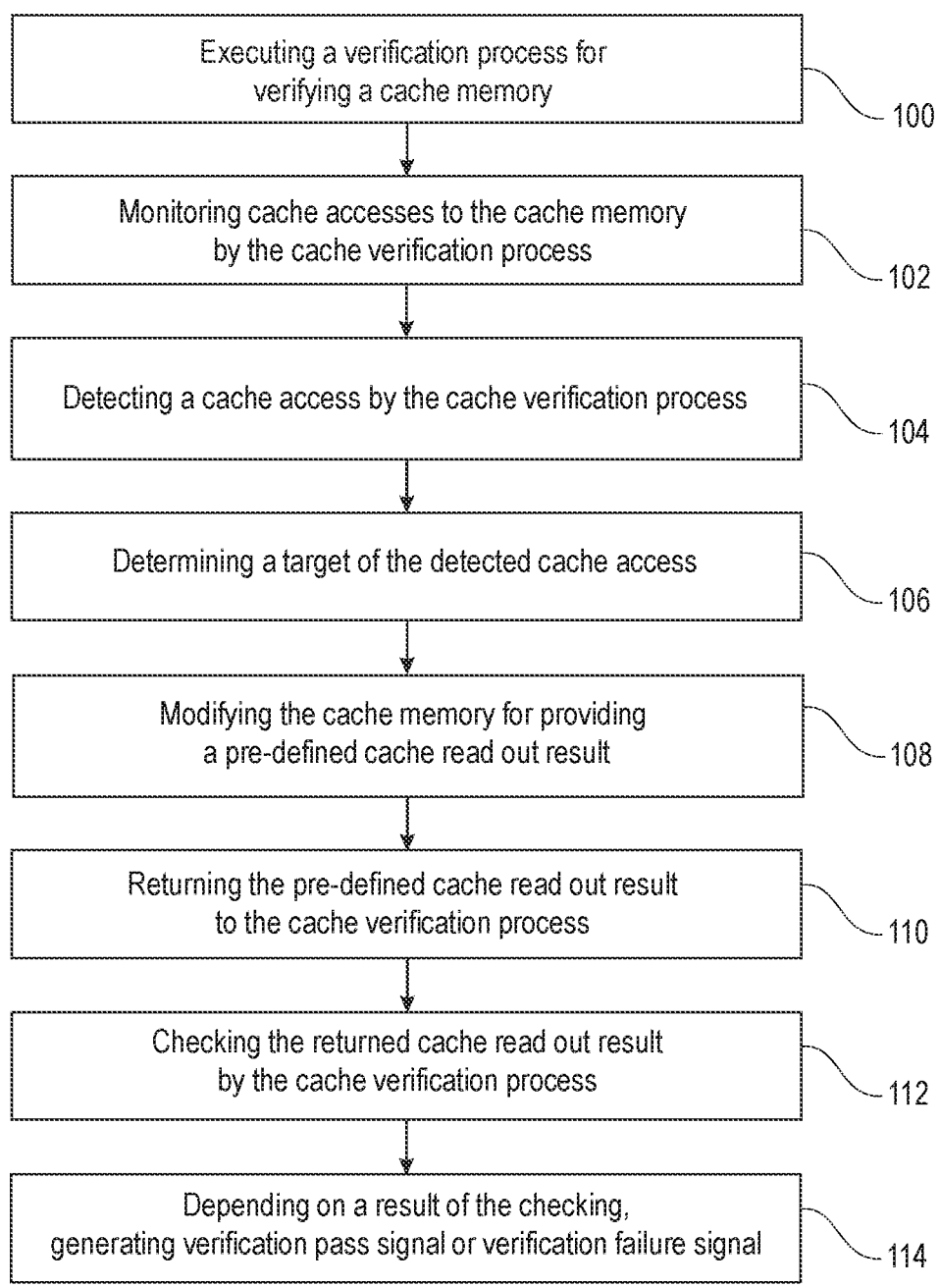
FIG. 1 is a flowchart of a method in accordance with an embodiment of the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Examples may allow for a cache verification, which may be able to avoid current system restriction by enforcing pre-defined cache read-out result. The pre-defined read-out result may, e.g., be a read-out result of which it is known that a system in development is able to handle them. This may, e.g., allow for starting complex cache verification early. It is not necessary to reduce a test case complexity, using perfectly pre-loaded caches, in order to avoid problems. By dynamically modifying the cache memory in a reactive manner on-the-fly in order to provide pre-defined cache read-out results, it is rather possible to ensure that only such cache read-out results are returned, which the system is able to handle or for which it is to be tested specifically whether the system is able to handle them.

By dynamically modifying the cache memory in a reactive manner on-the-fly any need of special cache pre-loading may be avoided. Rather cache accesses to the cache memory of the device under test are monitored. When an access occurs, the cache content of the cache memory of the device under test may be modified such that a pre-defined cache read-out result is returned for the detected cache access. This dynamically modifying the cache memory in a reactive manner on-the-fly may be executed between the cache accesses and the cache read-out.

Examples may enable a hitting of corner cases in a deliberate manner, which otherwise in a random simulation may be hard to hit. This may enable a close coverage of all relevant, interesting and/or possible scenarios in a purposeful manner. Time consuming approaches, which require a pre-loading of all addresses of the cache memory, letting driver pick a certain address and hoping to hit a scenario of interest may thus be avoided. By dynamically modifying the cache memory in a reactive manner on-the-fly in order to provide pre-defined cache read-out results resembling scenarios of interest, such scenarios of interest may be hit deliberately requiring comparably small compute resources. Furthermore, the time required for covering relevant scenarios of interest for a cache verification may be reduced significantly.

Thus, dependencies on other components regarding which possible cache read-out results are achievable may be avoided.

Depending on the type of modification of the cache memory, e.g., a memory reference model, like a local and/or a global memory reference model, may be modified. For example, the cache memory may be modified in accordance with a given memory reference model. For example, the modification of the cache memory may require a modifying and/or extending of the reference model, in order to ensure that a clean and coherent state is maintained after the modification of the cache memory. A memory reference model being modified may be comprised by the verification environment rather than the device under test.

Cache content, which may be modified in order to provide a pre-defined cache read-out result for a detected cache access, may, e.g., comprise a data content of the cache memory, a cache directory state, a least recently used state, or a most recently used state.

The cache verification process may, e.g., be executed within a verification environment, which comprises a cache memory reference model of the cache memory of the device under test. When the verification process has been started, one or more drive stimuli may result in cache activities comprising cache accesses to the cache memory of the device under test. Such cache accesses may be monitored by the verification environment. The verification environment may modify cache states of the cache memory of the device under test on-the-fly in a dynamic manner. The cache states may, e.g., be modified according to a pre-defined set of rules and/or a memory reference model. Thus, a pre-defined cache read out result may be provided in response to the detected cache access. For example, it may be ensured that cache read-out results comply with the pre-defined set of rules and/or a memory reference model. The pre-defined set of rules may, e.g., comprise coherence rules.

Exemplary scenarios may, e.g., comprise writing a valid memory reference model information into the cache memory of the device under test on-the-fly, in order to prevent a cache miss scenario.

A cache miss occurs, when a cache access tries to retrieve data from a cache memory, but the data to be retrieved is not comprised by the cache memory. A cache hit in contrast occurs, when the data to be retrieved is successfully retrieved from the cache memory.

Exemplary scenarios may, e.g., comprise modifying an existing cache memory entry state of the device under test, in order to prevent a cache miss scenario. For example, a cache memory entry state may be changed to being dirty to result in a cache memory cast out.

A dirty cache state indicates that there are pending changes in a cache entry that have not yet been written back to permanent storage. This state will not hamper user function, and a user may continue normal activity on the cache memory.

Casting out a changed data element refers to reading it from the cache memory and writing it to permanent storage.

Exemplary scenarios may, e.g., comprise writing a non-pre-loaded dirty cache entry on-the-fly to the cache memory of the device under test and extending one or more memory reference models, e.g., including address translation, accordingly.

For example, no special pre-loading may be required and a restriction to special test cases may be avoided. The test case coverage may rather be increased, while reducing computer resources required to achieve coverage closure. Furthermore, test case efficiency may be increase, while simulation runtime for the cache verification may be reduced.

A dirty cache state identifies data in the cache memory that is correct, but inconsistent with the data in permanent storage. A valid cache state identifies data in the cache memory that is correct and consistent with the data in permanent storage. An invalid cache state identifies data in the cache memory that is incorrect.

A speculation cache state identifies a cache state related to a pre-fetch algorithm configured for fetching data into the cache memory, which is guessed or speculated to be needed, but for which is not (yet) certain, that it will really be needed and/or used.

A coherency state identifies a cache state related to a cache coherency algorithm.

FIG. 1 is a flowchart of an exemplary method for verification of a cache memory of a device under test. In block 100, a cache verification process is executed configured for accessing via an interface and verifying the cache memory of the device under test. The device under test may, e.g., be provided using a software simulation module configured for simulating the device under test with the cache memory. The device under test being simulated may, e.g., be a chip, a processor, a multi-processor assembly like a multi-core processor, etc. For example, the device under test may, e.g., be provided in form of a hardware device under test comprising the cache memory. The cache memory may, e.g., be provided as a hardware and/or software component of the hardware device under test. The hardware device under test may, e.g., be the cache memory. The hardware device under test may, e.g., be a hardware device comprising a cache memory, like, e.g., a chip, a processor, a multi-processor assembly like a multi-core processor, etc. In block 102, while the cache verification process is executed, cache accesses to the cache memory of the device under test are monitored by the cache verification process via the interface. In block 104, a cache access is detected by the cache verification process via the interface. In block 106, in response to the detecting of the cache access, a target of the detected cache access is determined. In block 108, the cache memory is modified for providing a pre-defined cache read-out result for the detected cache access.

The modification of the cache memory may, e.g., comprise a modification of a data content of the cache memory. For example, a given data content may be amended or an additional data content may be generated and added to the cache memory. The modification of the cache memory may, e.g., comprise a modification of a state assigned to the target of the detected cache access. The state being modified may, e.g., be a directory state of the target of the detected cache access, like, but not limited to, e.g., valid, dirty, speculation, coherency. Alternatively or additionally, the state being modified may comprise a least recently used state of the target of the detected cache access. Alternatively or additionally, the state being modified may comprise a most recently used state of the target of the detected cache access. Alternatively or additionally, the state being modified may comprise another state based on another cache replacement policy.

The modification of the cache memory may, e.g., further comprise modifying a memory reference model of the cache memory of the device under test. The modification may, e.g., comprise extending the pre-defined memory reference model. Such an extension may be implemented, e.g., data content is added to the cache memory. The memory reference model being modified may, e.g., be a pre-defined local memory reference model or a pre-defined global reference model. A global memory reference model may reflect memory states from a system level point of view, while a local memory reference model may reflect memory states from a unit level point of view, i.e., provide a significantly smaller scope compared to a global memory reference model.

In block 110, the pre-defined cache read-out result is returned via the interface to the cache verification process in response to the detected cache access. In block 112, the returned cache read-out result is checked by the cache verification process. In block 114, depending on a result of the checking, a verification pass signal or a verification failure signal is generated. The verification pass signal indicates a passing of the verification test by the device under test. The verification failure signal indicates a failing of the verification test by the device under test.

Using a reactive on-the-fly modifying of the cache memory in order to provide pre-defined cache read-out results, neither a special pre-loading nor a special test case restriction may be needed. The test case coverage may be increased while reducing computer resources required to achieve coverage closure. Furthermore, test case efficiency may be increased while simulation runtime may be reduced. Modifications may not be restricted due to environment and test case constraints.

Figure 2:
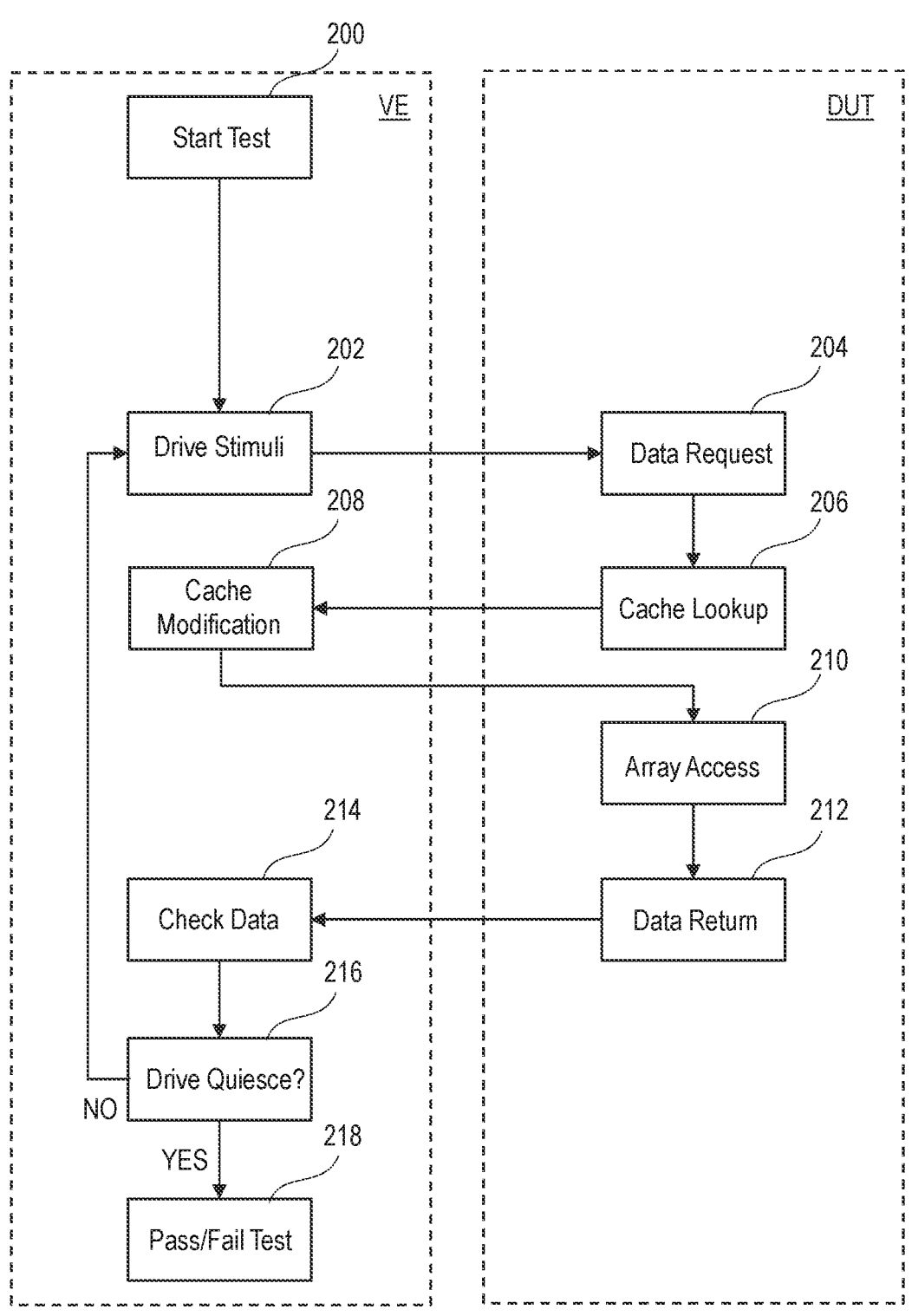
FIG. 2 is a flowchart of a method in accordance with an embodiment of the present invention.

FIG. 2 is a flowchart of an exemplary method for verification of a cache memory of a device under test (DUT). The device under test may, e.g., be provided using a software simulation module configured for simulating the device under test with the cache memory. The device under test being simulated may, e.g., be a chip, a processor, a multi-processor assembly like a multi-core processor, etc. For example, the device under test may, e.g., be provided in form of a hardware device under test comprising the cache memory. The cache memory may, e.g., be provided as a hardware and/or software component of the hardware device under test. The hardware device under test may, e.g., be the cache memory. The hardware device under test may, e.g., be a hardware device comprising a cache memory, like, e.g., a chip, a processor, a multi-processor assembly like a multi-core processor, etc. The cache memory may, e.g., be a single level cache memory. The cache memory may, e.g., be a multi-level cache memory comprising a hierarchical memory architecture with plurality of cache levels, e.g., one or more L1 caches, one or more L2 caches, one or more L3 caches, and/or one or more L4 caches. For example, the verification of the cache memory may be executed on the whole cache memory, e.g., all cache memory levels. It may, e.g., be executed in one step or it may be executed successively verifying array by array of the cache memory. In block 200, a cache verification test for verifying the cache memory of the device under test is started. A cache verification process, which performs the test, is executed by a verification environment, e.g., a computer device configured for executing the cache verification process. The cache verification process is for accessing, via an interface, and verifying the cache memory of the device under test. In block 202, a stimulus is driven by the cache verification process resulting in a request of data from the cache memory in block 204. In order to access the requested data, a cache lookup is performed in block 206. This cache access is detected and in block 208 a target of the detected cache access is determined and the cache memory is modified for providing a pre-defined cache read-out result for the detected cache access. In case of a simulation of the cache memory, the cache verification software may, e.g., overwrite or initiate an overwrite of a simulation model of the cache memory provided by the software simulation module, when modifying the respective cache memory. In case of a hardware device under test, the cache verification software may, e.g., overwrite or initiate an overwrite of the cache memory provided by the hardware device, when modifying the respective cache memory. In block 210, the target of the cache access, e.g., a cache array is accessed after the modification, data stored in the cache array is read-out and the readout data is returned to the cache verification process in block 212. In block 214, the read-out result returned in block 212 is checked by the cache verification process. In case further data has to be checked, i.e., it is determined in block 216 that the drive is not quiesce, the method continues with block 202. In case no further data has to be checked, i.e., it is determined in block 216 that the drive is quiesce, a verification signal is generated, which is descriptive of the result of the test. For example, in block 218, the verification signal is a verification pass signal indicating a passing of the verification test by the device under test, in case the checking of the returned data results in a positive test result. This positive test result may, e.g., indicate that the tested cache memory is failure free and can be used, e.g., for further testing or for production. In case of a simulation of the cache memory, a design of the cache memory may, e.g., be tested and verified before production. The successfully verified cache design may, e.g., be used as a template for producing cache memories and/or devices comprising cache memories with the verified cache memory design, like, e.g., chips, processors, multi-processor assemblies like multi-core processors, etc. In case a hardware device is tested, a design of the cache memory provided by the hardware device as a prototype may, e.g., be tested and verified. A successful verification of the design of the cache memory may be a requirement for starting a production of devices corresponding to the prototype successfully tested. For example, the hardware device under test may be a hardware device under test out of a production line and verified using the cache verification method for controlling quality of cache memories of hardware devices produced by the production line. In case of a positive test result, the cache memory being tested may, e.g., be accepted as failure free. In case of a positive test result, the production of the hardware devices comprising the cache memories may, e.g., be continued. For example, in block 218, the verification signal is a verification failure signal indicating a failing of the verification test, in case the checking of the returned data results in a negative test result. This failure signal may, e.g., indicate a failure of the cache memory. In case of a simulation of the cache memory, a design of the cache memory may, e.g., be tested and verified before production. In response to the failure signal, the design of the cache memory may be revised and retested until the design successfully passes the verification. The successfully verified cache design may, e.g., be used as a template for producing cache memories and/or devices comprising cache memories with the verified cache memory design, like, e.g., chips, processors, multi-processor assemblies like multi-core processors, etc. In case a hardware device is tested, a design of the cache memory provided by the hardware device as a prototype may, e.g., be tested and verified. In response to the failure signal, the hardware device comprising the cache memory may be revised and retested until the design successfully passes the verification. A successful verification of the design of the cache memory may be a requirement for starting a production of devices corresponding to the prototype successfully tested. For example, the hardware device under test may be a hardware device under test out of a production line and verified using the cache verification method for controlling quality of cache memories of hardware devices produced by the production line. For example, the failure signal may lead to a disabling of the cache memory array, where the failure of the cache access occurred. If such a failure signal occurs in a plurality of cache memory arrays, this may lead to a dismissal of the complete cache memory being tested. For example, a failure signal for a single cache memory array may already lead to a dismissal of the complete cache memory being tested. In case of a negative test result, the production of the hardware devices may comprise the cache memories may, e.g., be revised until the produced hardware devices successfully pass the verification and the production may be continued in the revised form.

Figure 3:
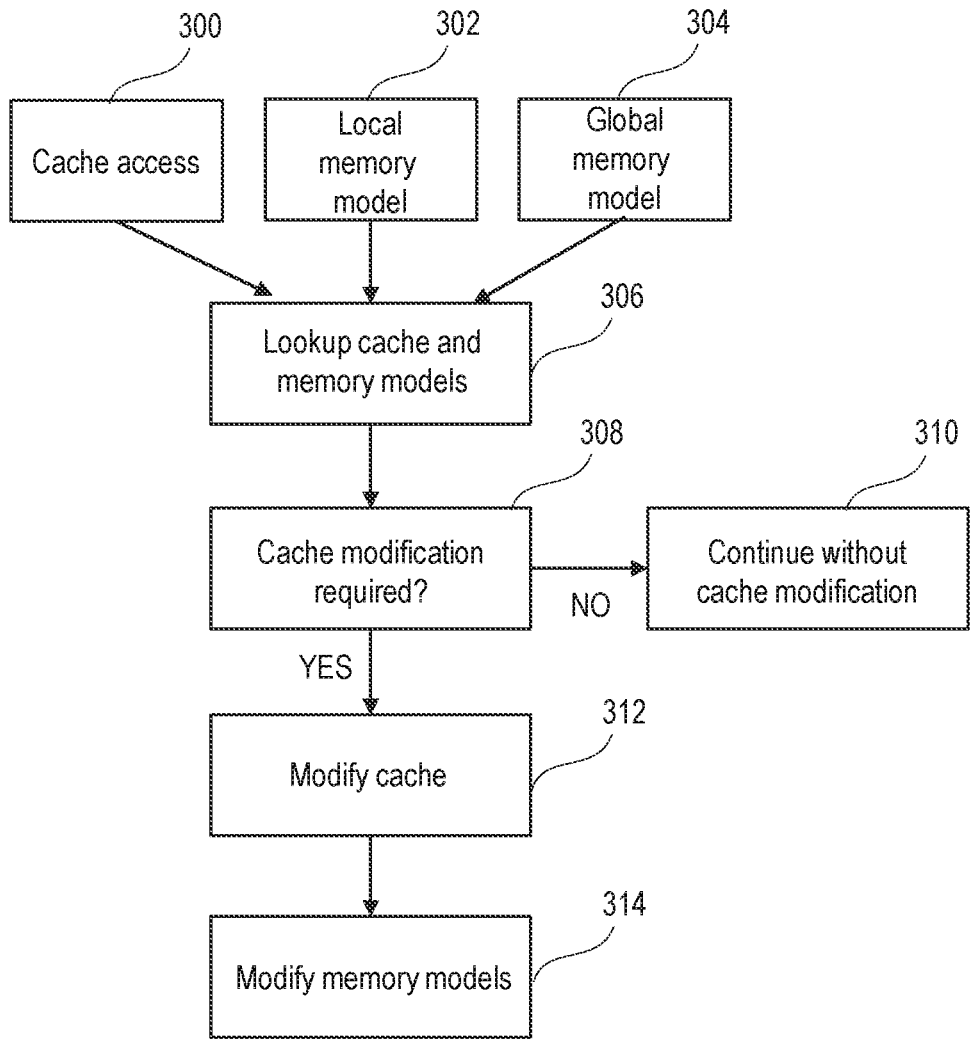
FIG. 3 is a flowchart of details of the method of FIG. 2 in accordance with an embodiment of the present invention.

FIG. 3 is a flowchart of details of the method of FIG. 2, i.e., of the modification of the cache memory according to block 208 of FIG. 2. In block 300, the detected cache access from the interface is received. In block 302, a local memory reference model may be received and, in block 304, a global memory reference model may be received. In block 306, the target of the detected cache access may be determined. Using the local memory reference model and/or the global memory reference model as well as looking up the determined target of the detected cache access, a read-out result for the detected cache access may be determined. In block 308, it is determined, whether a modification of the cache memory is required for providing a pre-defined cache read-out result for the detected cache access. In case the determined read-out result determined for the target of the detected cache access as it is matches the pre-defined cache read-out result, no modification is required and the method may continue in block 310 without modifying the cache memory. The read-out for the unmodified cache memory may be returned via the interface to the cache verification process in response to the detected cache access. In case the determined read-out result determined for the cache memory as it is does not match the pre-defined cache read-out result, the cache memory may be modified in block 312, in order to provide the pre-defined cache read-out result for the detected cache access. Thus, the pre-defined cache read-out result may be returned to the cache verification process in response to the detected cache access. In block 314, it is determined, whether the local memory reference model and/or the global memory reference model may have to be modified as well, in order to ensure a clean and coherent state of the local memory reference model and/or the global memory reference model after the cache memory modification.

Figure 4:
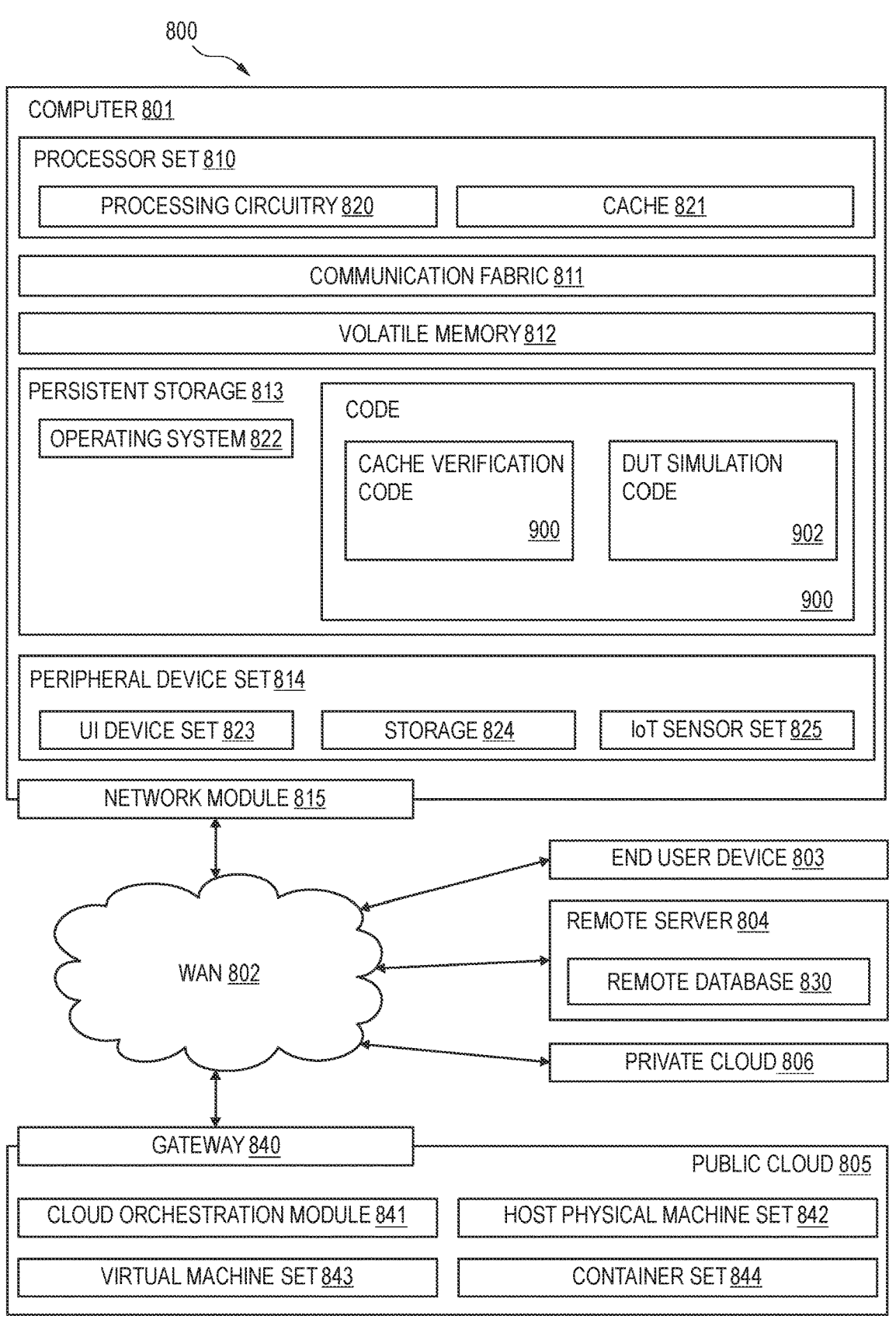
FIG. 4 is a computing environment according to an embodiment of the present invention. The drawings are not necessarily to scale. The drawings are merely schematic representations, not intended to portray specific parameters of the invention. The drawings are intended to depict only typical embodiments of the invention. In the drawings, like numbering represents like elements.

Referring now to FIG. 4, illustrative computing environment 800 is depicted. Computing environment 800 contains an example of an environment for the execution of at least some of a computer code 900 involved in performing the inventive methods. Computer-readable DUT simulation code 902 is, e.g., configured to implement a method for verification of a cache memory of a device under test. Computer-readable program code 900 may be executed by a computer 801 comprised by the computing environment 800 with a cache memory 821.

For example, the device under test may be provided using a software simulation module implemented using DUT simulation code 902. DUT simulation code 902 may be configured for providing a software simulation module simulating the cache memory of the device under test. The software simulation module may simulate the device under test and/or the cache memory. Execution of DUT simulation code 902 by processing circuitry 820 of processing set 810 may cause the processing circuitry 820 to control the computer 801 to execute the simulation. Execution of DUT simulation code 902 by processing circuitry 820 of processing set 810 may cause the processing circuitry 820 to control the computer 801 to execute a cache verification process configured for accessing the simulated cache memory of the device under test via a simulated interface and verifying the same. Cache accesses to the cache memory of the device under test by the cache verification process via the interface are monitored. A cache access by the cache verification process via the interface is detected. In response to the detecting of the cache access a target of the detected cache access is determined. The simulated cache memory is modified for providing a pre-defined cache read-out result for the detected cache access. The pre-defined cache read-out result is returned via the interface to the cache verification process in response to the detected cache access.

Using a software simulation module, a cache memory design may, e.g., be tested and verified using the cache verification method and, if necessary, revised until the design successfully passes the verification. The successfully verified cache design may, e.g., be used as a template for manufacturing cache memories and/or devices comprising cache memories with the verified cache memory design, like, e.g., chips, processors, multi-processor assemblies like multi-core processors, etc.

For example, the device under test with the cache memory to be verified by the cache verification process executed using computer 801 may be provided as a hardware device under test connected to computer 801 via an interface. The cache memory may, e.g., be provided as a hardware and/or software component of the hardware device under test. The hardware device under test may, e.g., be the cache memory. The hardware device under test may, e.g., be a hardware device comprising a cache memory, like, e.g., a chip, a processor, a multi-processor assembly like a multi-core processor, etc. Execution of program code 900 by processing circuitry 820 of processing set 810 may cause the processing circuitry 820 to control the computer 801 to execute a cache verification process configured for accessing via an interface and verifying the cache memory of the device under test. Cache accesses to the cache memory of the device under test by the cache verification process via the interface are monitored. A cache access by the cache verification process via the interface is detected. In response to the detecting of the cache access a target of the detected cache access is determined. The cache memory is modified for providing a pre-defined cache read-out result for the detected cache access. The pre-defined cache read-out result is returned via the interface to the cache verification process in response to the detected cache access.

Using the hardware device under test, e.g., as a prototype, a cache memory design may, e.g., be tested and verified under realistic conditions using the cache verification method. If necessary, a revised hardware device, e.g., with a revised cache memory design, may be provided for testing and verification, until the cache memory of the hardware device under test successfully passes the verification. For example, the hardware device under test may be a hardware device under test out of a production line and verified using the cache verification method for controlling quality of cache memories of hardware devices produced by the production line.

For example, the device under test may be a second computer comprising a second cache memory and the second cache memory may be verified by the cache verification process executed using computer 801. Execution of program code 900 by processing circuitry 820 of processing set 810 may cause the processing circuitry 820 to control the computer 801 to execute a cache verification process configured for accessing via an interface and verifying the cache memory of the device under test. Cache accesses to the cache memory of the device under test by the cache verification process via the interface are monitored. A cache access by the cache verification process via the interface is detected. In response to the detecting of the cache access a target of the detected cache access is determined. The cache memory is modified for providing a pre-defined cache read-out result for the detected cache access. The pre-defined cache read-out result is returned via the interface to the cache verification process in response to the detected cache access.

Alternatively, the device under test may, e.g., be a cache memory connected to the computer 801 via an interface without own processors.

Alternatively, the device under test may e.g., be a test chip, e.g., a prototype chip, with cache memory connected to the computer 801 via an interface. The test chip may e.g., also be a chip out of a fab production line to control the quality of the cache memory produced by the fab production line. Further, the cache verification process may e.g., be implemented in a test equipment of such a fab production line of semiconductor-based cache memories.

Alternatively, the device under test may e.g., be a processor with cache memory of different cache memory levels and connected to the computer 801 via an interface.

Alternatively, the device under test may e.g., be a device with multiple processors sharing cache memory of different cache memory levels and connected to the computer 801 via an interface.

In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric

811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 4. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is a memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Possible combination of features described above may be the following:

Feature combination 1. Computer implemented method for verification of a cache memory of a device under test, the method comprising: executing a cache verification process configured for accessing via an interface and verifying the cache memory of the device under test; monitoring cache accesses to the cache memory of the device under test by the cache verification process via the interface; detecting a cache access by the cache verification process via the interface, in response to the detecting of the cache access: determining a target of the detected cache access; modifying the cache memory for providing a pre-defined cache read-out result for the detected cache access; returning via the interface the pre-defined cache read-out result to the cache verification process in response to the detected cache access.

Feature combination 2. The method of feature combination 1, the modifying of the cache memory comprising modifying a data content of the cache memory, which is determined to be the target of the detected cache access.

Feature combination 3. The method of any of the preceding feature combinations, the modifying of the cache memory comprising generating a data content of the cache memory, which is determined to be the target of the detected cache access.

Feature combination 4. The method any of the preceding feature combinations, the modifying of the cache memory comprising modifying a state assigned to the target of the detected cache access.

Feature combination 5. The method of feature combination 4, the modifying of the cache memory comprising modifying a directory state of the target of the detected cache access.

Feature combination 6. The method of feature combination 5, the result of the modified directory state resulting from the modifying of the directory state of the target of the detected cache access being one of the following: valid, dirty, speculation, coherency.

Feature combination 7. The method of any of feature combinations 4 to 5, the modifying of the cache memory comprising modifying one or more of the following: a least recently used state of the target of the detected cache access, a most recently used state of the target of the detected cache access.

Feature combination 8. The method of any of the preceding feature combinations, the modifying of the cache memory further comprising modifying a memory reference model of the cache memory of the device under test.

Feature combination 9. The method of feature combination 8, the modifying of the memory reference model comprising extending the pre-defined memory reference model.

Feature combination 10. The method of any of feature combinations 8 to 9, the memory reference model being one of the following: a pre-defined local memory reference model, a pre-defined global reference model.

Feature combination 11. The method of any of the preceding feature combinations, the cache memory of the device under test being provided using one of the following: a software simulation module configured for simulating the cache memory of the device under test; a hardware device under test comprising the cache memory.

Feature combination 12. The method of any of the preceding feature combinations, further comprising: checking the returned cache read-out result by the cache verification process; depending on a result of the checking, generating one of the following: a verification pass signal, a verification failure signal.

Feature combination 13. A computer program product for verification of a cache memory of a device under test, the computer program product comprising a computer-readable storage medium having computer-readable program code embodied therewith, the computer-readable program code being configured to implement the method according to feature combinations 1 to 12.

Feature combination 14. A computer for verification of a cache memory of a device under test, the computer being configured to implement the method according to feature combinations 1 to 12.

What is claimed is:

1. A computer-implemented method for verification of a cache memory of a device under test, the method comprising:

executing a cache verification process configured for accessing via an interface to verify the cache memory of the device under test;

detecting a cache lookup of a target as part of a read request of data by the cache verification process via the interface;

responsive to the detecting, and prior to performing a cache read-out of the target, overwriting a cache memory of the target with a pre-defined cache read-out result comprising a scenario of interest; and performing the cache read-out of the target to the cache verification process responsive to the read request, wherein the cache read-out comprises the pre-defined cache read-out result.

2. The method of claim 1, wherein the overwriting of the cache memory further comprises:

modifying a data content of the cache memory, which is determined to be the target of the detected cache lookup.

3. The method of claim 1, wherein the overwriting of the cache memory further comprises:

generating a data content of the cache memory, which is determined to be the target of the detected cache lookup.

21

4. The method of claim 1, wherein the overwriting of the cache memory further comprises:

modifying a state assigned to the target of the detected cache lookup.

5. The method of claim 4, wherein the overwriting of the cache memory further comprises:

modifying the state responsive to identifying that a cache access of the target would cause a cache miss.

6. The method of claim 5, wherein the result of a modified state resulting from the modifying of the state of the target of the detected cache lookup is selected from the group consisting of valid, dirty, speculation, and coherency.

7. The method of claim 4, wherein the overwriting of the cache memory further comprises:

modifying one or more of a least recently used state of the target of the detected cache lookup, and a most recently used state of the target of the detected cache lookup.

8. The method of claim 1, wherein the overwriting of the cache memory further comprises:

modifying a memory reference model of the cache memory of the device under test.

9. The method of claim 8, wherein the modifying of the memory reference model comprises extending a pre-defined memory reference model.

10. The method of claim 1, wherein the cache memory of the device under test being provided using at least one of a software simulation module configured for simulating the cache memory of the device under test; or a hardware device under test comprising the cache memory.

11. The method of claim 1, further comprising:

checking the pre-defined cache read-out result by the cache verification process; and depending on a result of the checking, generating at least one of a verification pass signal, or a verification failure signal.

12. A computer program product for verification of a cache memory of a device under test, the computer program product comprising a computer-readable storage medium having computer-readable program code embodied therewith, the computer-readable program code being configured to implement a method comprising:

executing a cache verification process configured for accessing via an interface to verify the cache memory of the device under test;

detecting a cache lookup of a target as part of a read request of data by the cache verification process via the interface;

responsive to the detecting, and prior to performing a cache read-out of the target, overwriting a cache memory of the target with a pre-defined cache read-out result comprising a scenario of interest; and performing the cache read-out of the target to the cache verification process responsive to the read request, wherein the cache read-out comprises the pre-defined cache read-out result.

13. The computer program product of claim 12, wherein the overwriting of the cache memory further comprises:

modifying a data content of the cache memory, which is determined to be the target of the detected cache lookup.

14. The computer program product of claim 12, wherein the overwriting of the cache memory further comprises:

generating a data content of the cache memory, which is determined to be the target of the detected cache lookup.

15. The computer program product of claim 12, wherein the overwriting of the cache memory further comprises:

modifying a state assigned to the target of the detected cache lookup.

16. The computer program product of claim 15, wherein the overwriting of the cache memory further comprises modifying the state responsive to identifying that a cache access of the target would cause a cache miss.

17. The computer program product of claim 15, wherein the overwriting of the cache memory further comprises:

modifying one or more of a least recently used state of the target of the detected cache lookup, and a most recently used state of the target of the detected cache lookup.

18. The computer program product of claim 12, wherein the overwriting of the cache memory further comprises:

modifying a memory reference model of the cache memory of the device under test.

19. A computer system for verification of a cache memory of a device under test, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

executing a cache verification process configured for accessing via an interface to verify the cache memory of the device under test;

detecting a cache lookup of a target as part of a read request of data by the cache verification process via the interface;

responsive to the detecting, and prior to performing a cache read-out of the target, overwriting a cache memory of the target with a pre-defined cache read-out result comprising a scenario of interest; and performing the cache read-out of the target to the cache verification process responsive to the read request, wherein the cache read-out comprises the pre-defined cache read-out result.

20. The computer system of claim 19, wherein the overwriting of the cache memory further comprises:

modifying a data content of the cache memory, which is determined to be the target of the detected cache lookup.

21. The computer system of claim 19, wherein the overwriting of the cache memory further comprises:

generating a data content of the cache memory, which is determined to be the target of the detected cache lookup.

22. The computer system of claim 19, wherein the overwriting of the cache memory further comprises:

modifying a state assigned to the target of the detected cache lookup.

23. The computer system of claim 22, wherein the overwriting of the cache memory further comprises:

modifying the state responsive to identifying that a cache access of the target would cause a cache miss.

24. The computer system of claim 22, wherein the overwriting of the cache memory further comprises:

modifying one or more of a least recently used state of the target of the detected cache lookup, and a most recently used state of the target of the detected cache lookup.

25. The computer system of claim 19, wherein the overwriting of the cache memory further comprises:

modifying a memory reference model of the cache memory of the device under test.

* * * * *